(12) United States Patent
van Hattem

(10) Patent No.: US 10,602,870 B2
(45) Date of Patent: Mar. 31, 2020

(54) BEVERAGE PREPARATION DEVICE

(71) Applicant: Bravilor Holding B.V., Heerhugowaard (NL)

(72) Inventor: Johannes Cornelis van Hattem, Amerongen (NL)

(73) Assignee: Bravilor Holding B.V., Heerhugowaard (NL)

( * ) Notice: Subject to any disclaimer, the term of this patent is extended or adjusted under 35 U.S.C. 154(b) by 282 days.

(21) Appl. No.: 15/562,906

(22) PCT Filed: Mar. 10, 2016

(86) PCT No.: PCT/NL2016/050173
§ 371 (c)(1),
(2) Date: Sep. 29, 2017

(87) PCT Pub. No.: WO2016/159760
PCT Pub. Date: Oct. 6, 2016

(65) Prior Publication Data
US 2018/0078076 A1  Mar. 22, 2018

(30) Foreign Application Priority Data
Mar. 31, 2015 (NL) .................................. 2014557

(51) Int. Cl.
*A47J 31/00* (2006.01)
*A47J 31/36* (2006.01)
(52) U.S. Cl.
CPC ......... *A47J 31/005* (2013.01); *A47J 31/3614* (2013.01)

(58) Field of Classification Search
CPC .. A47J 31/005; A47J 31/3614; A47J 31/3633; A47J 31/407; A47J 31/3628;
(Continued)

(56) References Cited

U.S. PATENT DOCUMENTS 1,947,523 A * 2/1934 Hirschhorn ........ B65D 85/8043
426/83
6,101,923 A * 8/2000 Karg .................... A47J 31/4482
99/289 D
(Continued)

FOREIGN PATENT DOCUMENTS

EP  0937432 A1  8/1999
EP  2241228 A1 * 10/2010
(Continued)

*Primary Examiner* — Jimmy Chou
(74) *Attorney, Agent, or Firm* — N.V. Nederlandsch Octrooibureau; Catherine A. Shultz; Katelyn J. Bernier

(57) ABSTRACT

The invention relates to a beverage preparation device (1), comprising a central axis (2) with a brewing plane perpendicular to the central axis, wherein the brewing plane comprises a curved trajectory (3), curved with respect to the central axis, a first (4) and second (5) compression element, arranged for movement relative to each other along the curved trajectory, extending perpendicular to the curved trajectory, a brewing chamber (6) arranged for movement relative to the first and second compression elements along the curved trajectory, the brewing chamber having a tubular wall (7) extending parallel to the curved trajectory, wherein the tubular wall is arranged to be moved over an outer circumference (8, 9) of the first and/or second compression elements, a water inlet (14) arranged for discharging water into a brewing space, and a beverage outlet (15) arranged for discharging beverage from the brewing space.

17 Claims, 3 Drawing Sheets

(58) Field of Classification Search
CPC .............. A47J 31/3695; A47J 31/4482; A47J 31/4492; A47J 31/007; B65D 85/8043
USPC ..... 99/279, 282, 283, 284, 286, 287, 289 R, 99/291, 295, 296, 298, 307, 323
See application file for complete search history.

(56) References Cited

U.S. PATENT DOCUMENTS

| | | | |
|---|---|---|---|
| 6,240,832 B1* | 6/2001 | Schmed | A47J 31/3623 221/121 |
| 6,490,966 B2* | 12/2002 | Mariller | A47J 31/3676 99/289 R |
| 6,994,015 B2* | 2/2006 | Bruinsma | A47J 31/368 99/289 R |
| 7,513,192 B2* | 4/2009 | Sullivan | A47J 31/3695 99/289 R |
| 7,600,466 B2* | 10/2009 | Ruckstuhl | A47J 31/3676 99/289 R |
| 8,316,759 B2* | 11/2012 | Ozanne | A47J 31/3628 426/590 |
| 8,516,948 B2* | 8/2013 | Zimmerman | A47J 31/32 426/433 |
| 8,733,229 B2* | 5/2014 | Jarisch | A47J 31/3638 99/289 R |
| 8,875,617 B2* | 11/2014 | Favre | A47J 31/3628 99/289 R |
| 8,950,317 B2* | 2/2015 | Tanner | A47J 31/46 99/289 R |
| 10,080,459 B2* | 9/2018 | Lo Faro | A47J 31/407 |
| 2007/0221066 A1* | 9/2007 | Sullivan | A47J 31/3695 99/279 |
| 2009/0117249 A1* | 5/2009 | Ozanne | A47J 31/3628 426/590 |
| 2009/0199518 A1* | 8/2009 | Deuber | A47J 31/3628 53/492 |
| 2010/0173056 A1* | 7/2010 | Yoakim | A47J 31/22 426/433 |
| 2010/0192778 A1* | 8/2010 | Magno | A47J 31/3614 99/287 |
| 2012/0231126 A1* | 9/2012 | Lo Faro | A47J 31/407 426/115 |
| 2013/0142931 A1* | 6/2013 | Fin | A47J 31/3633 426/433 |
| 2013/0239820 A1* | 9/2013 | Baldo | A47J 31/3633 99/295 |
| 2013/0319252 A1* | 12/2013 | Castelli | A47J 31/3614 99/297 |
| 2014/0130680 A1* | 5/2014 | Fin | A47J 31/3633 99/295 |
| 2014/0272048 A1* | 9/2014 | Hristov | A47J 31/0673 426/433 |
| 2014/0299000 A1* | 10/2014 | Hanneson | A47J 31/46 99/300 |
| 2014/0338542 A1* | 11/2014 | Smith | A47J 31/407 99/295 |
| 2014/0338543 A1* | 11/2014 | Smith | A47J 31/407 99/295 |
| 2014/0342067 A1* | 11/2014 | Sullivan | A47J 31/3633 426/425 |
| 2014/0342069 A1* | 11/2014 | Tinkler | A47J 31/3633 426/425 |
| 2014/0352547 A1* | 12/2014 | Leuzinger | A47J 31/3676 99/295 |
| 2015/0013279 A1* | 1/2015 | Swerchesky | A47J 31/407 53/492 |
| 2015/0017288 A1* | 1/2015 | Lo Faro | A47J 31/407 426/112 |
| 2015/0079240 A1* | 3/2015 | Lo Foro | A47J 31/401 426/115 |
| 2015/0135965 A1* | 5/2015 | Lo Foro | A47J 31/407 99/285 |
| 2015/0164262 A1* | 6/2015 | Dingle | A47J 31/3633 99/295 |
| 2015/0201789 A1* | 7/2015 | Smith | A47J 31/407 99/295 |
| 2015/0223629 A1* | 8/2015 | Marchi | A47J 31/3609 99/287 |
| 2016/0051080 A1* | 2/2016 | Lo Faro | A47J 31/407 99/282 |
| 2016/0150907 A1* | 6/2016 | Bolognese | A47J 31/3633 99/289 R |
| 2016/0157665 A1* | 6/2016 | Doglioni Majer | A47J 31/3614 426/433 |
| 2016/0242594 A1* | 8/2016 | Empl | A47J 31/3623 |
| 2016/0302607 A1* | 10/2016 | Bonacci | A47J 31/3633 |
| 2017/0065120 A1* | 3/2017 | Ryser | A47J 31/22 |
| 2017/0208987 A1* | 7/2017 | Zhang | A47J 31/3633 |
| 2017/0233178 A1* | 8/2017 | Lo Faro | A47J 31/401 99/295 |
| 2018/0352995 A1* | 12/2018 | Fin | A47J 31/3633 |
| 2019/0167031 A1* | 6/2019 | Rijskamp | A47J 31/0647 |

FOREIGN PATENT DOCUMENTS

| | | |
|---|---|---|
| EP | 2241228 A1 | 10/2010 |
| EP | 2832270 A1 | 2/2015 |
| WO | 2015004613 A1 | 1/2015 |

* cited by examiner

BEVERAGE PREPARATION DEVICE

FIELD OF THE INVENTION

The invention relates to a beverage preparation device, such as used for preparing coffee, in particular espresso.

BACKGROUND OF THE INVENTION

Beverage preparation devices using a horizontally arranged brewing chamber and corresponding horizontally or vertically arranged pistons are known in practice. A problem with so arranged beverage preparation devices (in particular horizontal espresso brewers) is that they take up a lot of space.

An object of the present invention is thus to provide a beverage preparation device, which takes up less space.

SUMMARY OF THE INVENTION

Hereto, according to the invention, a beverage preparation device is provided, comprising;
a) a central axis with a brewing plane perpendicular to the central axis, wherein the brewing plane comprises a curved trajectory, curved with respect to the central axis,
b) a first and second compression element, arranged for movement relative to each other along the curved trajectory, extending perpendicular to the curved trajectory,
c) a brewing chamber arranged for movement relative to the first and/or second compression elements along the curved trajectory, the brewing chamber having a tubular wall extending parallel to the curved trajectory, wherein the tubular wall is arranged to be moved over an outer circumference of the first and/or second compression elements, wherein:
  i. in an idle position, the first and second compression elements are spaced-apart along the curved trajectory,
  ii. in a filling position, the tubular wall is moved relative to the first compression element along the curved trajectory, such that a filling space is formed delimited by the tubular wall and the second compression element, the tubular wall comprising an opening for receiving a powder for preparing the beverage in the filling space,
  iii. in a brewing position, the first and second compression elements are moved towards each other along the curved trajectory to compress the powder, and the tubular wall is moved over the first and second compression elements, such that the first and second compression elements and the tubular wall enclose a brewing space for preparing the beverage with the powder,
d) a water inlet arranged for discharging water into the brewing space, and
e) a beverage outlet arranged for discharging beverage from the brewing space.

Thus, a very compact, 'round' design of the beverage preparation device can be realized. Preferably, the curved trajectory concerns a circle being concentric with respect to the central axis.

It should furthermore be noted that after entering the idle position, the device will usually immediately proceed to the filling position to commence a further cycle. Therefore, the device may be idle in the idle position for only a very short period.

Another embodiment relates to an aforementioned device, wherein the central axis extends in a horizontal direction, i.e. the device has an orientation similar to a giant wheel. In certain positions and for certain movements of the brewing chamber and the compression elements, use can be made of gravity. For example, when the beverage is prepared in the brewing space, gravity can be used to discharge the beverage from the brewing chamber.

Another embodiment relates to an aforementioned device, wherein the central axis extends in a vertical direction, as opposed to a horizontal direction. In some instances, such an orientation of the central axis may be beneficial, for instance when the brewing chamber is relatively large and heavy and moving the brewing chamber around the axis would require a lot of energy.

Another embodiment relates to an aforementioned device, wherein the opening is formed by an open longitudinal end, when seen along the curved trajectory, of the tubular wall. Such an opening will be relatively large and can be advantageously used to receive the ingredient powder, without spilling the powder.

Another embodiment relates to an aforementioned device, wherein the first compression element is static. The moving parts will then be formed by the second compression element and the brewing chamber. Due to the first compression element being static, energy will be saved and the device's mechanical reliability will increase.

Another embodiment relates to an aforementioned device, wherein the second compression element can be dragged along by an outer longitudinal end of the tubular wall of the brewing chamber. This closed longitudinal end will normally be the longitudinal end opposing the (open) longitudinal end comprising the opening for receiving the powder. The above construction essentially only requires the brewing chamber to be driven, again saving energy and improving reliability.

Another embodiment relates to an aforementioned device, wherein the second compression element is provided with a reversible locking mechanism, wherein the reversible locking mechanism is arranged for locking the second compression element in a locked state, preventing movement thereof along the curved trajectory, and unlocking the second compression element in an unlocked state, for allowing the second compression element to be dragged along by the brewing chamber along the curved trajectory. The reversible locking mechanism may be formed by a spring-biased locking mechanism or by a magnetic locking mechanism, wherein a magnet is arranged at the non-compression end of the second compression element and a corresponding piece of metal is arranged on a stationary part of the device (or vice versa).

Another embodiment relates to an aforementioned device, wherein, when the opening is formed by an open longitudinal end of the tubular wall, in the filling position, the opening of the open longitudinal end extends in a horizontal direction. Thus, the ingredient powder can be conveniently deposited in the filling space by using gravity.

Another embodiment relates to an aforementioned device, wherein, in the brewing position, the water inlet is arranged for injecting water in a circumferential space between the tubular wall and the outer circumference of the first compression element, wherein the circumferential space is in fluid connection with the brewing space. This prevents ingredient powder, in particular coffee powder, from getting stuck in the circumferential space, because it is flushed back into the brewing space by the injected water.

Another embodiment relates to an aforementioned device, wherein a compression plane comprising a compression surface of the first and/or second compression element extends at such a perpendicular distance from the central axis, that the compression surface of the first compression element and the compression surface of the second compression element are parallel in the brewing position, such that an even compression of the powder is obtained.

Another embodiment relates to an aforementioned device, wherein the compression surfaces of the first and second compression elements are elliptical or oval, wherein the ellipse or oval comprises a long axis and a short axis, wherein the long axis runs parallel to the central axis. Such shapes prevent or at least counteract the occurrence of uneven compression of the ingredient powder.

Another embodiment relates to an aforementioned device, wherein the brewing chamber is connected to a drive mechanism to drive the brewing chamber along the curved trajectory.

Another embodiment relates to an aforementioned device, wherein a rotatable shaft is arranged at the position of the central axis, wherein the shaft is part of the drive mechanism, wherein the shaft is driven by a drive motor to drive the brewing chamber along the curved trajectory.

Another embodiment relates to an aforementioned device, wherein an outer circumference of the tubular wall of the brewing chamber is provided with a rack-and-pinion drive mechanism arranged to drive the tubular wall along the curved trajectory. Preferably, the rack is then provided along the outer circumference of the tubular wall, whereas the pinion is connected to a drive motor.

Another embodiment relates to an aforementioned device, wherein the beverage outlet is arranged in the second compression element to obtain an even more compact design of the device.

Another embodiment relates to an aforementioned device, wherein the beverage outlet is provided with a pressure valve. In particular when the ingredient powder is a coffee powder, or more in particular a coffee powder from which espresso is to be made, the pressure valve allows the beverage to be obtained at the right pressure. The powder can be unevenly compressed in some cases, causing uneven distribution of the hot water though the compressed powder. This is prevented by the pressure valve, which opens only when a predetermined pressure value is exceeded.

Another embodiment relates to an aforementioned device, wherein, when the opening is formed by an open longitudinal end of the tubular wall, in the idle position the opening of the open longitudinal end extends in a vertical direction, wherein the compression surface of the second compression element is aligned with the opening.

BRIEF DESCRIPTION OF THE DRAWINGS

An embodiment of a beverage preparation device according to the invention will by way of non-limiting example be described in detail with reference to the accompanying drawings. In the drawings.

DETAILED DESCRIPTION OF THE INVENTION

FIGS. 1-5 will be discussed in conjunction. A beverage preparation device 1, such as for preparing espresso, is shown, comprising a central axis 2 with a brewing plane perpendicular to the central axis 2. The brewing plane comprises a curved trajectory 3, curved with respect to the central axis 2. The curved trajectory 3 preferably is concentric with respect to the central axis 2. The central axis 2 may extend in a horizontal direction, as shown, or a vertical direction. The device 1 is arranged on a mounting plate 30, which can be part of, or connected to, a beverage dispensing machine.

Figure 1:
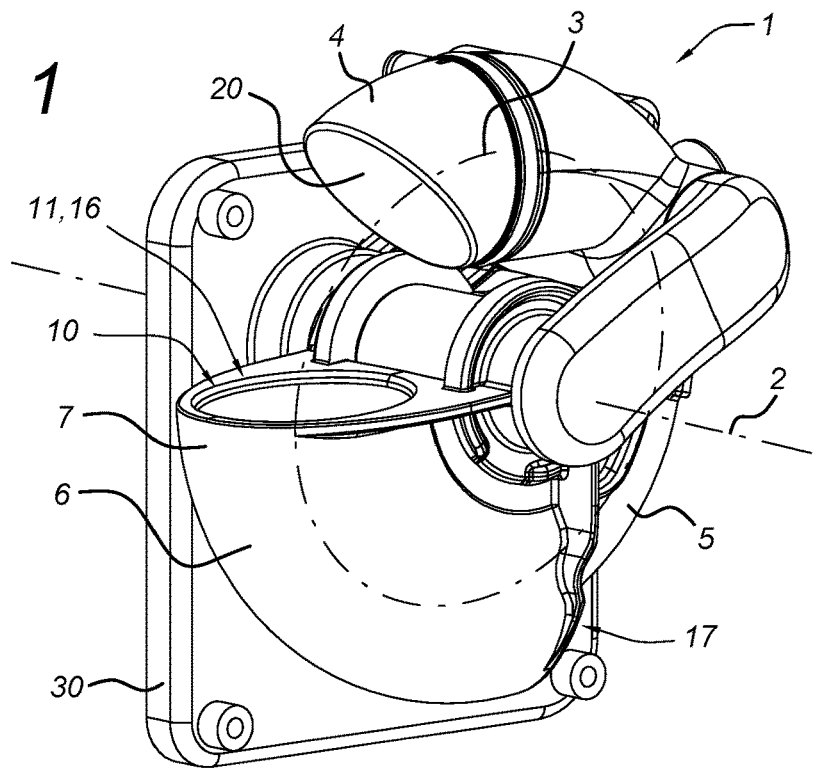
FIG. 1 shows a schematic perspective view of an exemplary embodiment of a device according to the invention.
Figure 2:
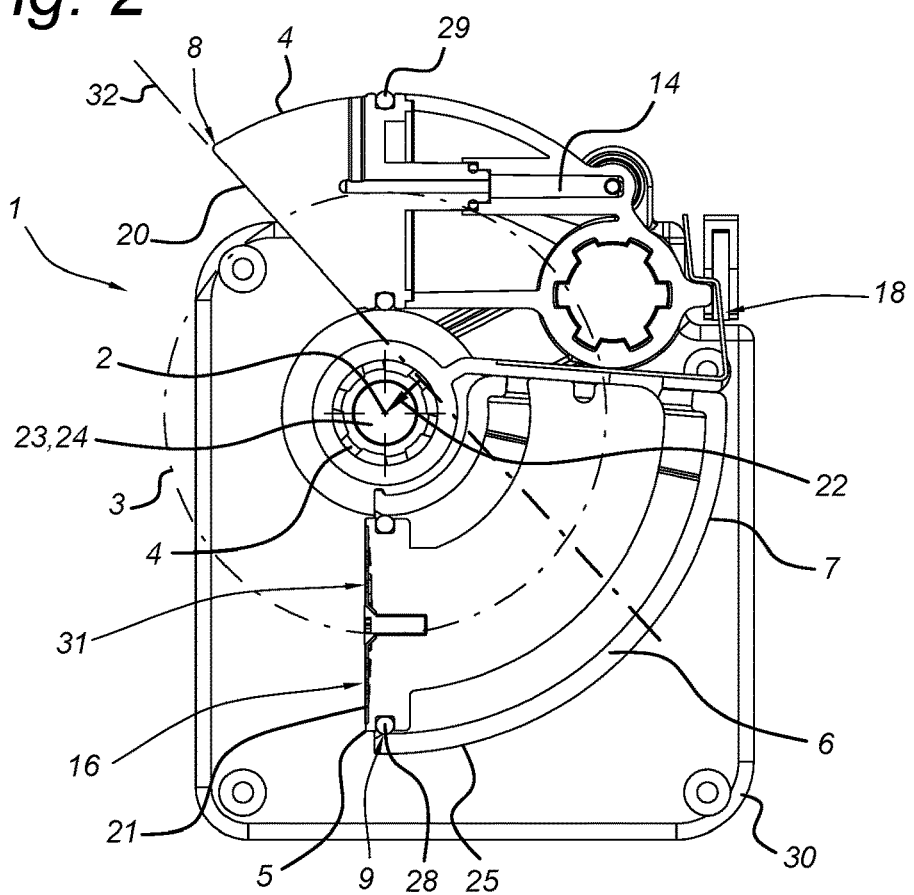
FIG. 2 shows a cross-section of the device of FIG. 1 along the brewing plane comprising the curved trajectory, wherein the device is in the idle/end position.

FIG. 2 shows a first 4 and second 5 compression element, arranged for movement relative to each other along the curved trajectory 3. The compression elements 4, 5 generally extend perpendicular to the curved trajectory 3. A brewing chamber 6 is furthermore provided, arranged for movement relative to the first 4 and second 5 compression elements along the curved trajectory 3. The brewing chamber 6 has a tubular wall 7, in particular a cylindrical wall, extending parallel to (along) the curved trajectory 3. The tubular wall 7 is arranged to be moved over an outer circumference 8, 9 of the first 4 and/or second 5 compression elements. In the embodiment as shown, the first compression element 4 is fixed/stationary. Both compression elements 4, 5 may be formed as pistons. This holds in particular for the second compression element 5. The compression elements 4, 5 may have an outer diameter of for instance 5-10 cm, preferably around 5 cm. Preferably, the compression surface of the compression elements 4, 5 is circular, although other shapes are also conceivable. The device 1 as a whole may have an outer diameter (in the brewing plane) of 10-20 cm, such as about 20 cm, although for preparing larger quantities of beverage larger dimensions are also conceivable. Along the central axis 2, the device may have a 'depth' of for instance, 5-10 cm, such as around 7 cm.

FIG. 2 shows the device 1 in an idle position I. The first 4 and second compression elements 5 are then spaced-apart along the curved trajectory 3. The idle position I can also be viewed as the end position, i.e. the position wherein the brewing process is completed and the spent powder pill is ejected.

Figure 3:
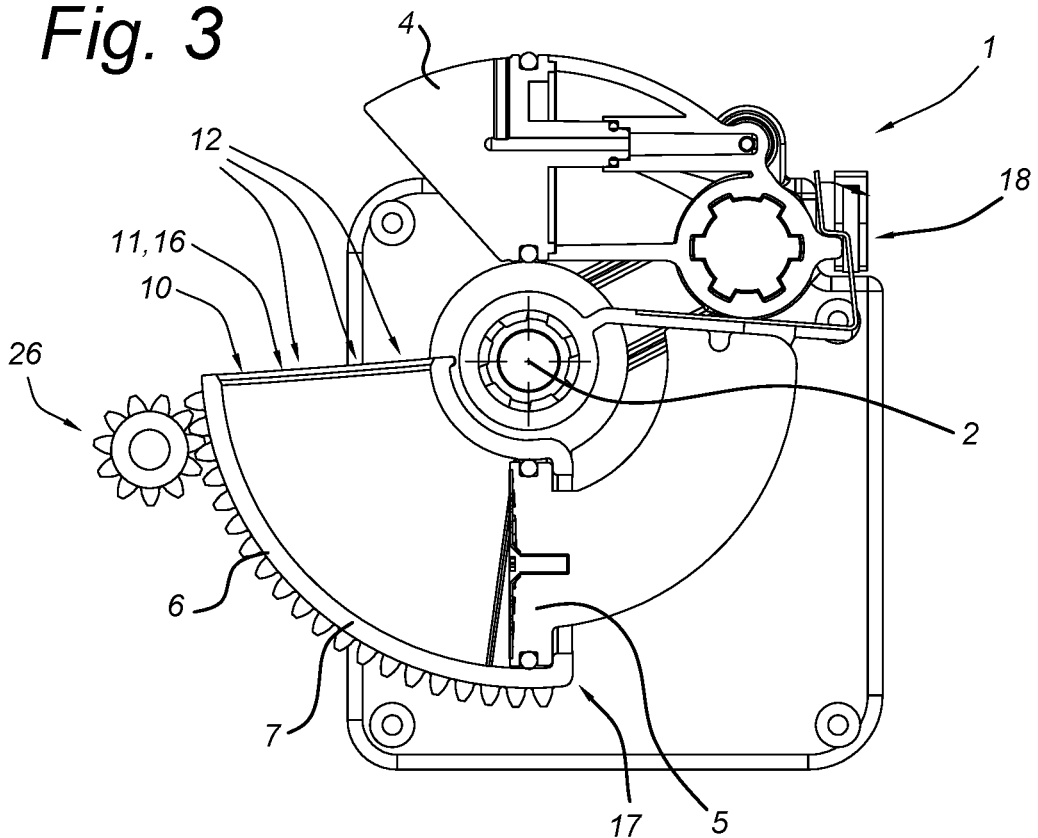
FIG. 3 shows a cross-section of the device, analogous to the one shown in FIG. 2, with the device in the filling position.

FIG. 3 shows the device 1 in a filling position II. Therein, the tubular wall 7 is moved relative to the first compression element 4 along the curved trajectory 3, such that a filling space 10 is formed delimited by the tubular wall 7 and the second compression element 5. The tubular wall 7 comprises an opening 11 for receiving a powder 12 for preparing the beverage in the filling space 10. Preferably, the opening 11 extends horizontally to facilitate filling of the filling space 10 with powder 12. The opening 11 is formed by an open longitudinal end 16, when seen along the curved trajectory 3, of the tubular wall 7.

Figure 4:
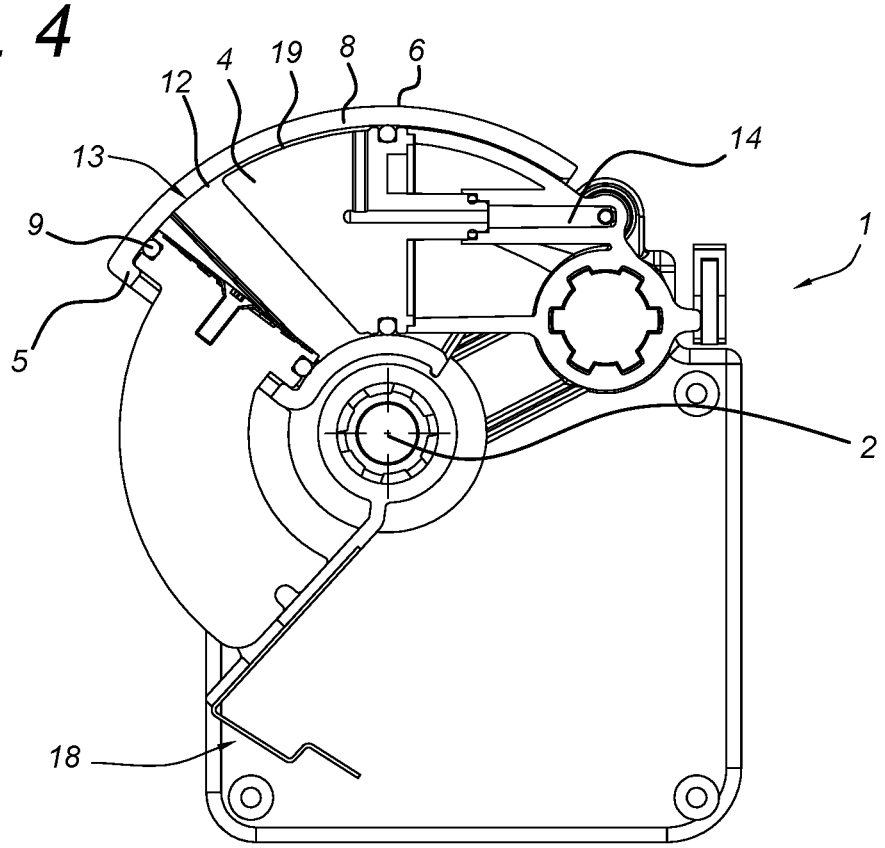
FIG. 4 shows a cross-section of the device, analogous to the ones shown in FIGS. 2 and 3, with the device in the brewing position.

FIG. 4 shows the device 1 in a brewing position III. The first 4 and second 5 compression elements are moved towards each other along the curved trajectory 3 to compress the powder 12. The tubular wall 7 is moved over the first 4 and second 5 compression elements, such that the first 4 and second 5 compression elements and the tubular wall 7 enclose a brewing space 13 for preparing the beverage with the powder 12.

The device 1 furthermore comprises a water inlet 14 arranged for discharging water into the brewing space 13 and a beverage outlet 15 arranged for discharging beverage from the brewing space 13.

In the embodiment of the device 1 as shown in FIGS. 1-5, the second compression element 5 is dragged along by a closed longitudinal end 17 of the tubular wall 7 of the brewing chamber 6 when the device 1 transits from the filling position II (FIG. 3) to the brewing position III (FIG. 4). The closed longitudinal end 17 is thereto provided with appropriate edges to pull the second compression element 5 along towards the first compression element 4. On the other hand, when the device 1 transits from the brewing position (III) to the idle position (I), friction caused by the sealing ring 28 (between the second compression element 5 and the brewing chamber 6, i.e. the tubular wall 7) will cause the second compression element 5 to be moved towards its idle position I by the brewing chamber 6.

The second compression element 2 (i.e. the end thereof not needed for compression of the powder) is provided with a spring-biased locking mechanism 18 comprising a clamp (which more or less has properties similar to a leaf spring) with engages a protruding part of the device 1 in the idle position I and the filling position II. The locking mechanism 18 is arranged for locking the second compression element 5 in a locked state, preventing movement thereof along the curved trajectory 3, and unlocking the second compression element 5 in an unlocked state, for allowing the second compression element 5 to be dragged along by the brewing chamber 6 along the curved trajectory 3.

As shown in FIG. 4, in the brewing position III, the water inlet 14 is arranged for injecting water in a circumferential space 19 between the tubular wall 7 and the outer circumference 8 of the first compression element 5. The tight circumferential space 19 is in fluid connection with the brewing space 13 to allow the injected water to reach the brewing space 13. Due to the injected, hot water first reaching the outer regions of the compressed powder 12 an even distribution of the water throughout the compressed powder 12 is achieved. A sealing ring 29 is provided for preventing the injected water from leaking out at the wrong side of the circumferential space 19, i.e. for making sure that the water is forced towards the brewing space 13 only.

As can be seen in FIG. 2, a compression plane 32 comprising a compression surface 20 of the first 4 (and/or second compression element 5) extends at such a perpendicular distance 22 from the central axis 2, that the compression surface 20 of the first compression element 4 and the compression surface 21 of the second compression 5 element are parallel in the brewing position III, such that an even compression of the powder 12 is obtained.

Alternatively, the compression surfaces 20, 21 of the first 4 and second compression elements 5 can be elliptical (not shown), wherein the ellipse comprises a long axis and a short axis, wherein the long axis runs parallel to the central axis 2.

The brewing chamber 6 is connected to a drive mechanism 23 to drive the brewing chamber 6 along the curved trajectory.

Thereto, a rotatable shaft 24 can be arranged at the position of the central axis 2, wherein the shaft is part of the drive mechanism 23, wherein the shaft 24 is driven by a drive motor (not shown) to drive the brewing chamber 6 along the curved trajectory 3. The non-compression end of the second compression element 5 (the end that 'protrudes' through a corresponding hole in the generally closed end 17 of the tubular wall 7) may be connected to a bracket, plate or similar connection means, that in turn is arranged for rotating (freely) around the shaft 24.

Alternatively, or additionally, an outer circumference 25 of the tubular wall 7 of the brewing chamber 6 is provided with a rack-and-pinion drive mechanism 26 arranged to drive the tubular wall 7 along the curved trajectory 3 (as shown in FIG. 3).

Figure 5:
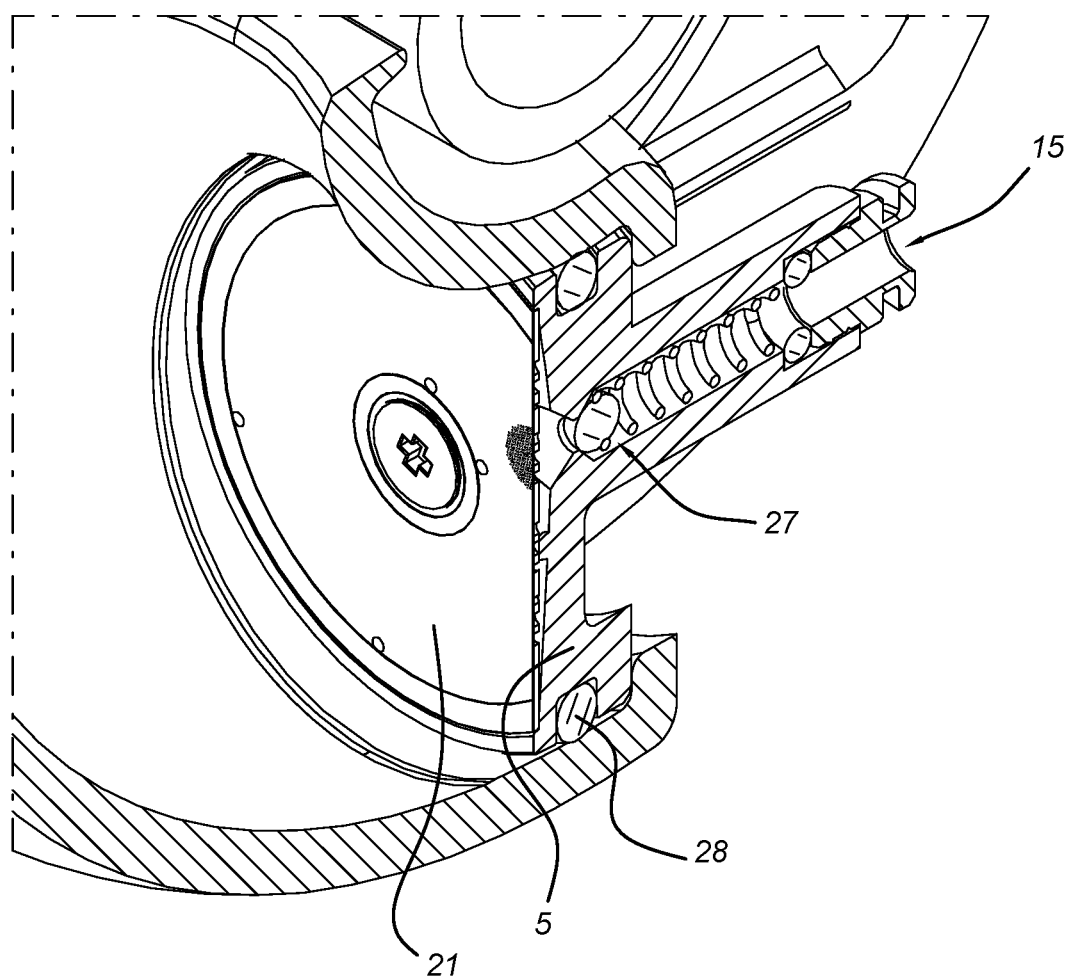
FIG. 5 shows a close-up perspective view of the second compression element.

As shown in FIG. 5, preferably the beverage outlet 15 is arranged in the second compression element 5. To prevent powder 12 from entering the beverage outlet 15, a sieve 31 or the like can be provided. Preferably, the beverage outlet 15 is provided with a pressure valve 27 that only opens when a predetermined water pressure in the brewing space 13 is exceeded. The beverage outlet 15 can be arranged away from the geometric center of the compression surface 21, i.e. more towards the central axis 2.

When the device 1 returns to the idle position I, the opening 11 of the open longitudinal end 16 preferably extends in a vertical direction and the compression surface 21 of the second compression element 5 is aligned with the opening 11 to eject a spent powder pill out of the opening 11.

Thus, the invention has been described by reference to the embodiment discussed above. It will be recognized that the embodiment is susceptible to various modifications and alternative forms well known to those of skill in the art without departing from the spirit and scope of the invention. Accordingly, although a specific embodiment has been described, this is an example only and not limiting upon the scope of the invention.

REFERENCE NUMERALS

1. Beverage preparation device
2. Central axis
3. Curved trajectory
4. First compression element
5. Second compression element
6. Brewing chamber
7. Tubular wall
8. Outer circumference of the first compression element
9. Outer circumference of the second compression element
10. Filling space
11. Opening for receiving ingredient powder
12. Ingredient powder
13. Brewing space
14. Water inlet
15. Beverage outlet
16. Open end of tubular wall
17. Closed end of tubular wall
18. Locking mechanism
19. Circumferential space
20. Compression surface of first compression element
21. Compression surface of second compression element
22. Perpendicular distance of compression plane from central axis
23. Drive mechanism
24. Rotatable shaft
25. Outer circumference of tubular wall
26. Rack-and-pinion drive mechanism
27. Pressure valve
28. Sealing ring
29. Sealing ring
30. Mounting plate
31. Sieve
32. Compression plane of first compression element
I=idle position
II=filling position
III=brewing position

The invention claimed is:

1. A beverage preparation device, comprising:
   a) a central axis with a brewing plane perpendicular to the central axis, wherein the brewing plane comprises a curved trajectory, curved with respect to the central axis,
   b) a first compression element and a second compression element, arranged for movement relative to each other along the curved trajectory, extending perpendicular to the curved trajectory,
   c) a brewing chamber arranged for movement relative to the first and/or second compression elements along the curved trajectory, the brewing chamber having a tubular wall extending parallel to the curved trajectory, wherein the tubular wall is arranged to be moved over an outer circumference of the first and/or second compression elements, wherein:
      i. in an idle position, the first and second compression elements are spaced-apart along the curved trajectory,
      ii. in a filling position, the tubular wall is moved relative to the first compression element along the curved trajectory, such that a filling space is formed delimited by the tubular wall and the second compression element, the tubular wall comprising an opening for receiving a powder for preparing the beverage in the filling space,
      iii. in a brewing position, the first and second compression elements are moved towards each other along the curved trajectory to compress the powder, and the tubular wall is moved over the first and second compression elements, such that the first and second compression elements and the tubular wall enclose a brewing space for preparing the beverage with the powder,
   d) a water inlet arranged for discharging water into the brewing space, and
   e) a beverage outlet arranged for discharging beverage from the brewing space.

2. The device according to claim 1, wherein the central axis extends in a horizontal direction.

3. The device according to claim 1, wherein the central axis extends in a vertical direction.

4. The device according to claim 1, wherein the opening is formed by an open longitudinal end, when seen along the curved trajectory, of the tubular wall.

5. The device according to claim 1, wherein the first compression element is static.

6. The device according to claim 1, wherein the second compression element is arranged to be dragged along by a closed longitudinal end of the tubular wall of the brewing chamber when the device transits from the filling position to the brewing position.

7. The device according to claim 6, wherein the second compression element is provided with a reversible locking mechanism, wherein the reversible locking mechanism is arranged for locking the second compression element in a locked state, preventing movement thereof along the curved trajectory, and unlocking the second compression element in an unlocked state, for allowing the second compression element to be dragged along by the brewing chamber along the curved trajectory.

8. The device according to claim 2, wherein the opening is formed by an open longitudinal end, when seen along the curved trajectory, of the tubular wall, in the filling position, the opening of the open longitudinal end extends in a horizontal direction.

9. The device according to claim 1, wherein, in the brewing position, the water inlet is arranged for injecting water in a circumferential space between the tubular wall and the outer circumference of the first compression element, wherein the circumferential space is in fluid connection with the brewing space.

10. The device according to claim 1, wherein a compression plane comprising a compression surface of the first and/or second compression element extends at such a perpendicular distance from the central axis, that the compression surface of the first compression element and the compression surface of the second compression element are parallel in the brewing position, such that an even compression of the powder is obtained.

11. The device according to claim 1, wherein the compression surfaces of the first and second compression elements are elliptical or oval, wherein the ellipse or oval comprises a long axis and a short axis, wherein the long axis runs parallel to the central axis.

12. The device according to claim 1, wherein the brewing chamber is connected to a drive mechanism to drive the brewing chamber along the curved trajectory.

13. The device according to claim 12, wherein a rotatable shaft is arranged at the position of the central axis, wherein the shaft is part of the drive mechanism, wherein the shaft is driven by a drive motor to drive the brewing chamber along the curved trajectory.

14. The device according to claim 12, wherein an outer circumference of the tubular wall of the brewing chamber is provided with a rack-and-pinion drive mechanism arranged to drive the tubular wall along the curved trajectory.

15. The device according to claim 1, wherein the beverage outlet is arranged in the second compression element.

16. The device according to claim 15, wherein the beverage outlet is provided with a pressure valve.

17. The device according to claim 8, wherein the opening of the open longitudinal end extends in a vertical direction, wherein in the idle position the compression surface of the second compression element is aligned with the opening.

* * * * *